H. C. VERHEY.
INTERNAL COMBUSTION ENGINE.
APPLICATION FILED MAY 25, 1914.
1,182,120.
Patented May 9, 1916.
4 SHEETS—SHEET 1.
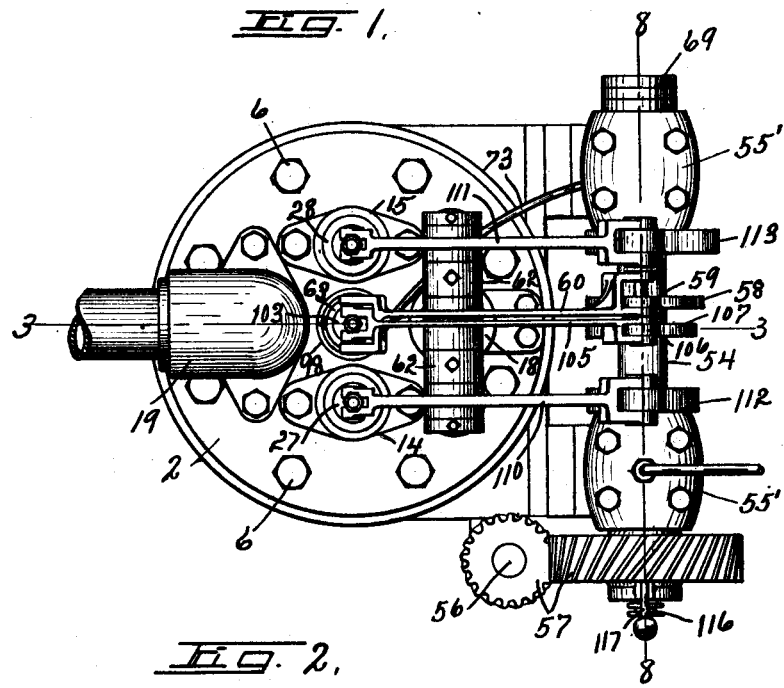
WITNESSES:
INVENTOR
H. C. Verhey
BY Howard P. Denison
ATTORNEY.

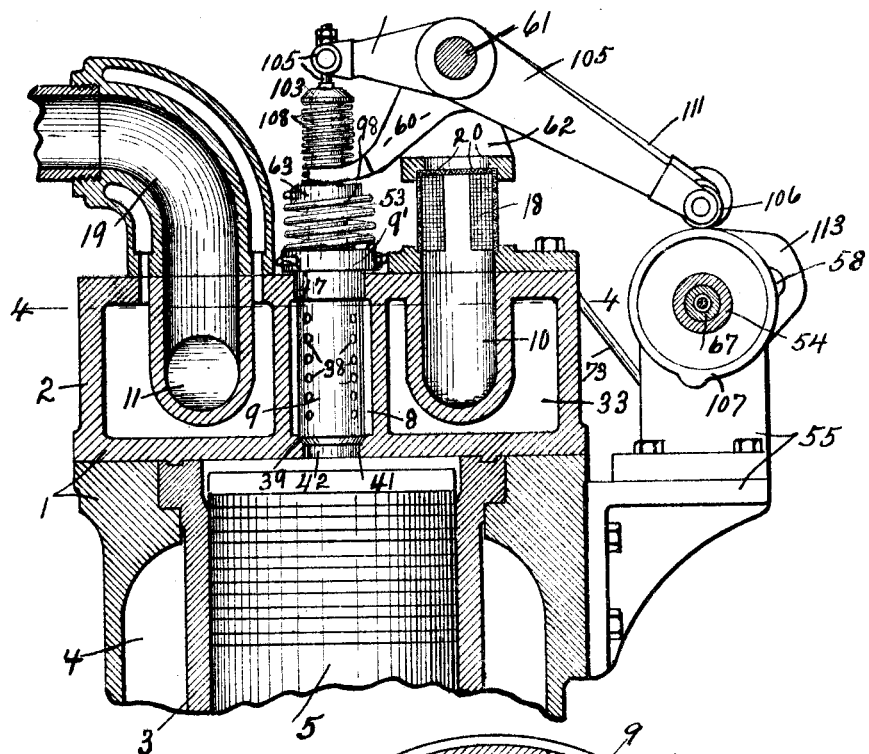

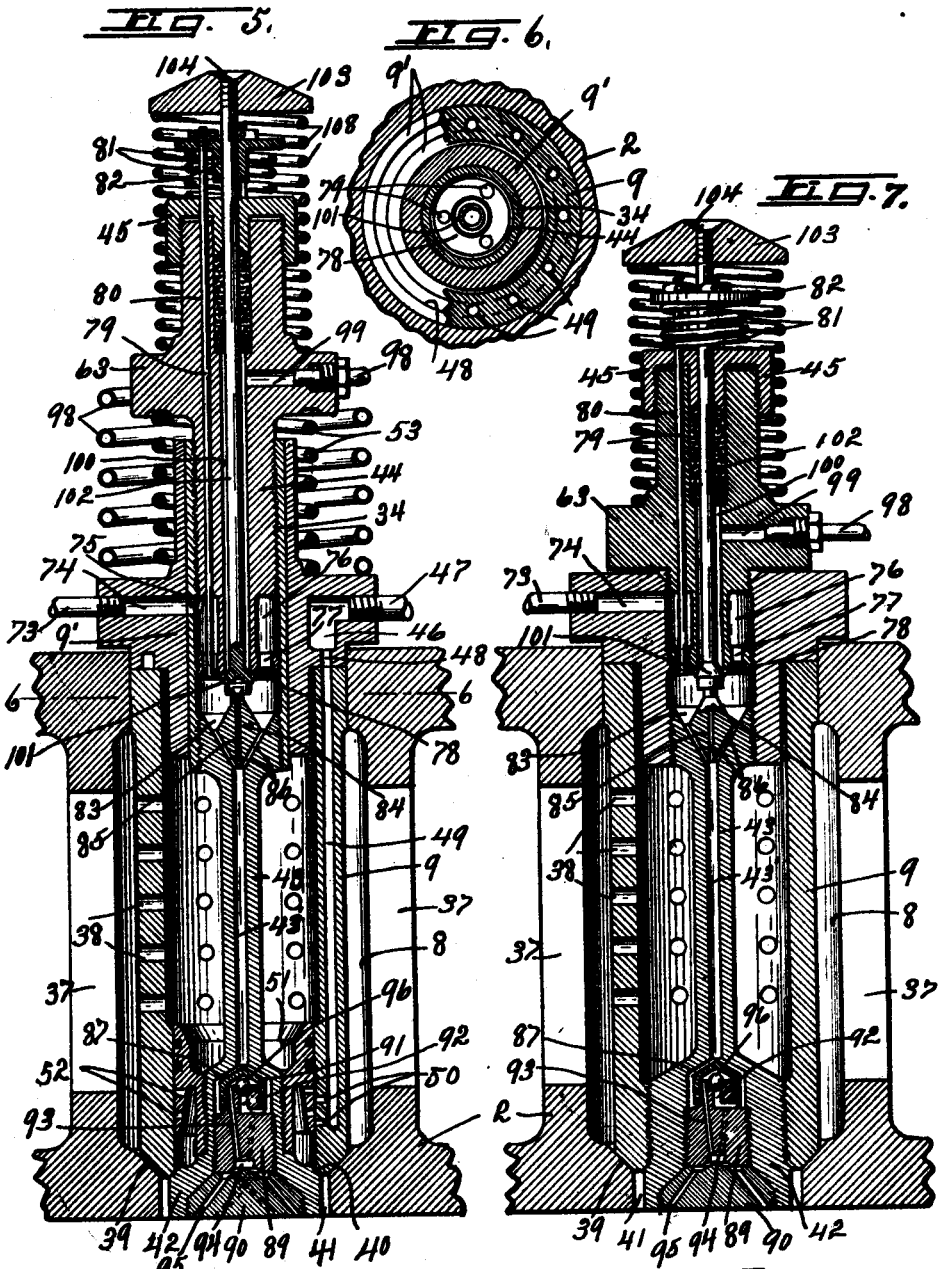

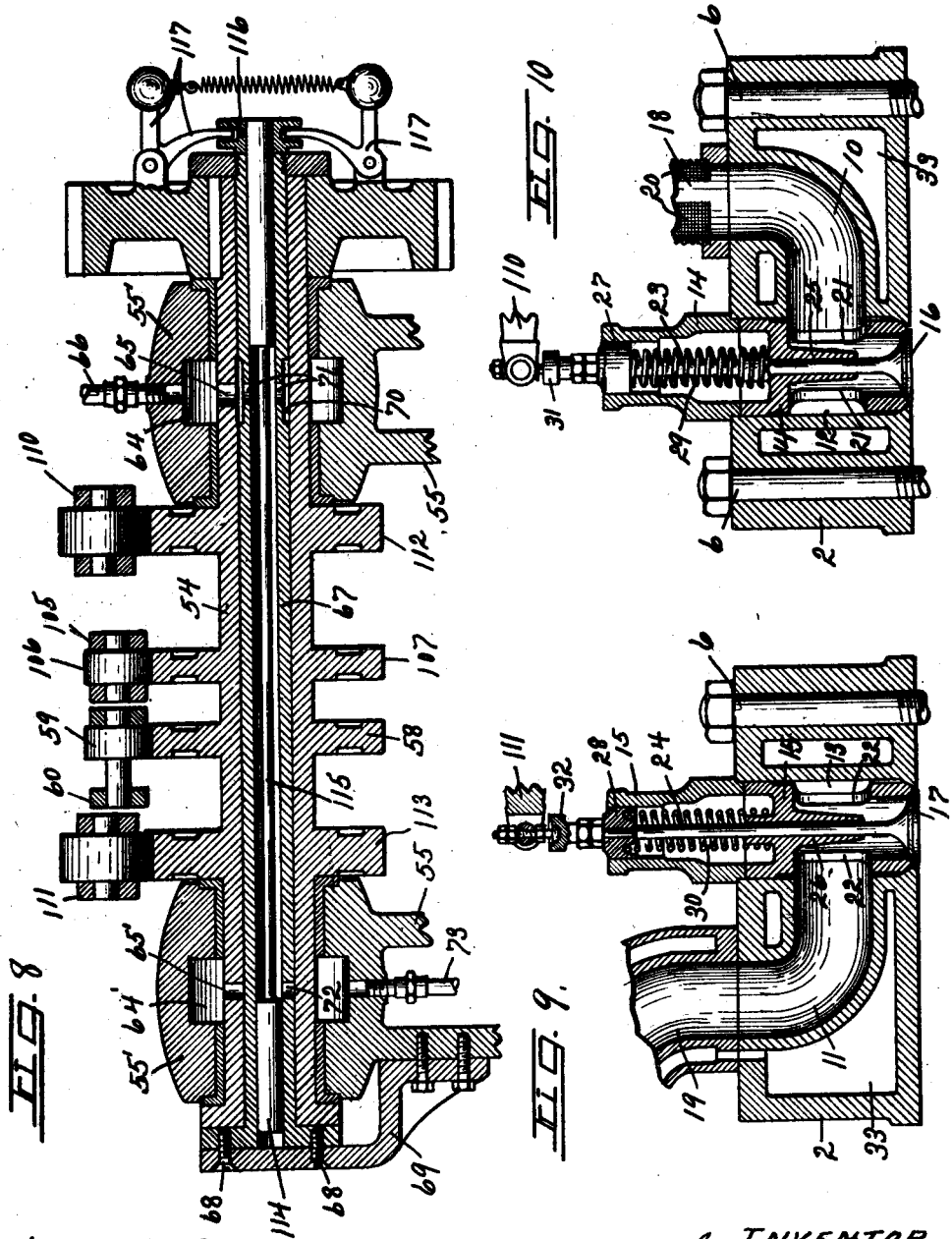

UNITED STATES PATENT OFFICE.

HUIBERT C. VERHEY, OF AUBURN, NEW YORK.

INTERNAL-COMBUSTION ENGINE.

1,182,120.  Specification of Letters Patent.  Patented May 9, 1916.

Application filed May 25, 1914. Serial No. 840,813.

*To all whom it may concern:*

Be it known that I, HUIBERT C. VERHEY, of Auburn, in the county of Cayuga, in the State of New York, have invented new and useful Improvements in Internal-Combustion Engines, of which the following, taken in connection with the accompanying drawings, is a full, clear, and exact description.

This invention relates to certain improvements in internal combustion engines of the Diesel motor type in which the combustion of the fuel for impelling the piston is produced by the resultant heat of air compression by such piston.

The more important objects are: First:—to increase the general working efficiency and power of this type of engine. Second:—to obviate the necessity for high pressure oil pumps. Third:—to establish a closer regulation of the oil feed for each charge according to requirements under varying loads and speeds. Fourth:—to produce a more finely divided pulverization of the oil and more effective mixture with air at the point of introduction into the combustion chamber so as to increase the combustibility and resultant expansive force of the fuel. Fifth:—to prolong the fuel injection to a degree of maximum power-efficiency in the working stroke of the piston. Sixth:—to concentrate the various valves around the axis of and upon the head of the cylinder so that the latter may be symmetrically reinforced against working strains and also against warping or cracking by expansion or contraction.

Other objects and uses will be brought out in the following description.

In the drawings, Figure 1 is a top plan of a single cylinder engine embodying the various features of my invention. Fig. 2 is a side elevation of the part shown in Fig. 1, the lower portion of the cylinder being broken away. Fig. 3 is an enlarged vertical section taken on line 3—3, Fig. 1. Fig. 4 is an enlarged horizontal section taken in the plane of line 4—4, Fig. 3. Fig. 5 is an enlarged vertical sectional view of the central valve mechanism shown in elevation in Fig. 3 and adjacent portion of the cylinder head in which it is mounted. Fig. 6 is an inverted horizontal section through the same valve mechanism taken in the plane of line 6—6, Fig. 5. Fig. 7 is a vertical sectional view of a modified valve mechanism similar to Fig. 5, but omitting the starting mechanism. Fig. 8 is an enlarged vertical sectional view through the cam shaft and adjacent mechanisms taken on line 8—8, Fig. 1. Figs. 9 and 10 are vertical sectional views of the exhaust valve and air inlet valve taken respectively in the planes of lines 9—9, and 10—10, Fig. 4.

The cylinder, as —1—, is shown as provided with a specially designed head —2— and is also provided with an inner lining —3— forming, with the outer shell, a water jacket —4—, the lining —3— being firmly secured in place between the head and adjacent end of the outer casing to receive a piston —5— which may be connected to the crank shaft of the engine in any well known manner for transmitting motion thereto.

The head —2— is circular and concentric with the axis of the main body of the cylinder to which it is secured by bolts —6— and is preferably hollow and provided with an integral substantially rectangular shell —7— (Fig. 4) wholly within the outer shell and having a central opening —8— vertically through the head for receiving a valve case —9—, said inner shell —7— being provided with an air inlet passage —10— and an exhaust passage —11— located respectively at diametrically opposite sides of the central vertical opening —8— and communicating with their respective valve chambers —12— and —13— which are also located at diametrically opposite sides of the central opening —8— for receiving suitable valve casings —14— and —15— and valves —16— and —17—.

The passages —10— and —11— are located equidistant from the center of the vertical opening —8— and extend horizontally in parallel lines and equal distances from opposite sides of their respective valve chambers —12— and —13— and terminate in upwardly extending elbows opening through the top of the cylinder head and communicating respectively with a screen inlet conduit —18— and an exhaust conduit —19— as shown more clearly in Figs. 1, 2, and 3, the inlets of the conduit —18— being provided with suitable screens —20— to exclude dust and other foreign matter from being drawn into the cylinder of the engine.

The valve chambers —12— and —13— are cylindrical and extend vertically through the head —1— equi-distant from the central vertical opening —8— and, as previously stated, communicate with their respective passages —10— and —11—.

The valve casings —14— and —15— are secured in their respective chambers —12— and —13— and extend across the adjacent ends of the corresponding passages —10— and —11— to provide suitable valve seats on their lower ends for the valves —16— and —17—, the outer portions thereof being hollow and provided with ports —21— and —22— communicating with the adjacent passages —10— and —11—, thereby permitting the entrance of atmospheric air to the interior of the chamber when the valve —16— is opened and also permitting the exit of the products of combustion when the valve —17— is opened.

The valves —16— and —17— are of substantially the same form and size and provided with upwardly projecting stems —23— and —24— extending through and some distance above the top of the cylinder head —2— and their corresponding valve cases —14— and —15—. The intermediate portions of the stems are guided in glands —25— and —26— in the adjacent portions of their respective valve cases and their upper ends are provided with annular shoulders —27— and —28— which are also guided in the upper ends of the corresponding valve case. These valves are automatically closed by coil springs —29— and —30— surrounding their respective valve stems between the corresponding glands —25— and —26— and annular shoulders —27— and —28—. The upper ends of these valve stems are provided with suitable heads —31— and —32— having concave seats in their opposite sides for coöperative engagement with suitable actuators hereinafter more fully described.

The inner shell —7— is symmetrically arranged within the outer shell of the cylinder head —2— and spaced apart therefrom to form an intervening water-containing chamber —33— (Fig. 4) for cooling purposes, said inner shell being cored out at opposite sides of the valve chamber —8— and between the passages —10— and —11— as shown in Fig. 4 for forming additional water-containing chambers —34— and —35— which communicate with the outer chamber —33— through passages —36— and also communicate with the valve chamber —8— through the passages —37— for cooling the valve case, which is also provided with a series of radial openings —38— therethrough for permitting the circulation of the cooling agent (as water) around the oil pulverizer, valves and fuel passages which are located within the valve case and will be hereinafter more fully explained.

This valve case is cylindrical and fitted at its upper end in a corresponding opening in the top of the cylinder head, the lower end of the case being beveled to fit against a corresponding seat —39— on the bottom of the cylinder head and is provided with an inner annular valve seat —40— registering with an opening —41— in the bottom of the head —2— for communication with the combustion chamber of the cylinder.

Engaged with the valve seat —40— is what may be termed a starting valve —42— (Fig. 5) having an upwardly extending hollow stem —43— secured to the lower end of a vertically movable coupling sleeve —34'— which is guided in a hollow cap —9'— on the upper end of the valve case —9— and is secured to a hollow vertically movable head —44— extending some distance above the cap —9'—and is covered at the top by a stuffing box or gland —45—.

The portion of the cap —9'— just above the cylinder head —2— is provided with a chamber —46— having an inlet conduit —47— and a plurality of vertical delivery ports —48— registering with corresponding vertical passages —49— in the sides of the valve case —9—, said passages —49— extending downwardly to a point in proximity to the lower end of the valve case where they communicate with radial passages —50— leading to the interior of said valve case.

Secured to the valve —42— is a crosshead —51— fitting with an air and liquid-tight joint the interior bore of the valve case and provided with radial passages —52— which are movable into and out of registration with the ports —50— as the valve —42— is lowered and raised in a manner hereinafter described, said valve being normally held to its seat by a coil spring —53— surrounding the upper reduced end of the cap —9'— between the enlarged portion thereof and the underside of the enlarged portion of the head —44— as shown more clearly in Fig. 5, thereby normally holding the ports —52— out of registration with the ports —50—.

The starting air may be introduced at will into the chamber —46— and passages —49— from what is commonly known as a starting bottle or any other reservoir containing air under high pressure sufficient to start the engine when the high pressure air is admitted to one of the cylinders by opening the starting valve —42— and thereby registering its radial ports —52— with the ports —50— in the valve case at which time the crank shaft of the engine will have been turned by hand or other means to bring the piston of the cylinder with which the starting valve is associated to the starting point of its working stroke.

The means for opening the starting valve against the action of its retracting spring —53— comprises a cam shaft —54— journaled in suitable brackets —55— on one side of the main body of the cylinder —1— separate from the cylinder —2— and is adapted to be driven from the crank shaft of the engine by any suitable power-transmitting mechanism, such as a vertical shaft —56— and spiral gears —57— of such ratio as to drive the cam shaft half the speed of the crank shaft.

Secured to the cam shaft is a cam —58— acting upon a roller —59— on one end of a lever —60— which is fulcrumed at —61— on a bracket —62— on the top of the cylinder head —2— and has its other end bearing upon the upper face of an annular enlargement —63— of the valve head —44— as shown more clearly in Figs. 1, 2 and 3, the roller —59— being movable axially by hand or otherwise along its supporting spindle on the lever —60— out of contact with the cam —58— after the engine is started so as to prevent the operation of the starting of the valve when the engine is running under fuel power.

The bearings, as —55'—, for the cam shaft are provided with annular chambers —64— and —64'— surrounding the adjacent portions of the cam shaft which is tubular and provided with radial openings —65— and —65'— through one side thereof communicating with their respective annular chambers —64— and —64'—, the chamber —64— being provided with a fuel inlet conduit —66— leading from any available source of oil supply under sufficient pressure to automatically open the valve presently described for controlling the passage of the oil to the engine.

The lengthwise opening through the cam shaft —54— is cylindrical and preferably of the same size from end to end, and in this opening is fitted a relatively stationary tubular spindle —67— having one end secured by screw —68— or other equivalent fastening means to a bracket —69— on the adjacent bearing —55'— as shown more clearly in Fig. 8. This stationary spindle is provided with an annular recess —70— and radial ports —71— communicating with the fuel inlet port —65— and is also provided with an additional radial port —72— in transverse alinement with the fuel delivery port —65'— so as to cause the port —65'— to register with the port —72— once during each revolution of the cam shaft for establishing communication between the interior of the stationary spindle —67— and fuel delivery chamber —64'— when the ports —65'— and —72— are so registered.

The chamber —64'— is provided with an outlet conduit —73— leading to an inlet port —74— in the cap —9'— of the valve chamber —9—, Fig. 5, the inlet —74— normally registering with a radial port —75— in the adjacent side of the coupling sleeve —34—, thereby establishing communication between the source of fuel supply and an oil chamber —76— in the coupling sleeve. This oil chamber —76— is formed by reducing the diameter of the lower portion of the head —44— which registers with the ports —75— leaving the extreme lower end of the head below the chamber —76— of full diameter for screw engagement with the interior of the sleeve —34—, said lower end being provided with vertical passages —77— therethrough normally closed by a valve —78— seated against the underside of the ports to control communication between the chamber —76— and oil pulverizer hereinafter described.

The valve —78— preferably consists of a ring concentric with the axis of the head —44— and sleeve —34— and is supported by a plurality of, in this instance three, upwardly extending rods —79— passing through corresponding openings —80— in the head —44— and gland —45— so as to protrude some distance above said gland where the upper ends are operatively connected to a flanged collar —82— which is supported by a coil spring —81— having its lower end resting upon the gland or stuffing box —45—, said spring being of just sufficient tension to normally close the valve against its seat and to open under pressure of the oil which may be introduced into the chamber —76— when the port —65'— of the cam shaft is registered with the port —72— in the relatively stationary tubular spindle —67—.

In this manner, the valve —78— is opened by the oil pressure to admit a definite quantity of oil to the pulverizer once in every two revolutions of the crank shaft of the engine, the ports —65— and —72'— being so relatively arranged as to cause the introduction of such charge to the pulverizer at the beginning of each working stroke of the piston.

The oil commonly used in this type of engine is rather thick and sluggish and needs to be thoroughly broken up into very thin particles and is introduced in this finely comminuted state with air under high pressure into the combustion chamber of the engine in the following manner:

The upper end of the hollow stem —43— is enlarged and secured into the lower end of the coupling sleeve —34— some distance below the valve —78— and is provided with a conical recess —83— in its upper face surrounding the central conical projection —84—, the upper end of said hollow stem being also provided with a central air passage —85— leading from the apex of the conical projection —84— to the interior of the tubular stem —43— and is also provided with a series of downwardly converging oil passages —86— leading from the basis of the conical recess —83— to the interior of the tubular stem, said passages —86— being relatively small so as to aid in pulverizing or breaking up the oil while the air passage —85— serves to admit air under high pressure through the point of convergence of the oil ducts for the purpose of further pulverizing oil and mixing therewith preparatory to injection of the mixture into the combustion chamber of the engine.

The lower end of the opening or duct, as —43'— extending centrally through the tubular stem —43— terminates in divergent channels or relatively small passages —87— formed in the lower enlarged end of the hollow stem —43— which is secured centrally into the cross head —51— and forms a continuation of the valve —42—.

The enlarged lower end of the tubular stem —43— is chambered out and threaded internally to receive coaxial screw plugs —89— and —90—, the plug —89— being arranged at the upper end of the plug —90— and is provided with a reduced upper end threaded externally for receiving a cap —91— which is spaced a slight distance apart from the adjacent portions of the stem —43— to form the oil passage —87—. This reduced upper end of the plug —89— is provided with an annular passage —92— having one portion thereof vertical and central and another portion leading radially from the central portion to the lower end of the passage —87—. The plug —89— is also provided with additional vertical passages —93— located at one side of the passage —92— and extending from the top to the bottom of the plug, said passages —93— being also of relatively small cross sectional area and have their lower ends communicating with a relatively small chamber —94— centrally in a piece of the plug.

The plug —90— is provided with a series of relatively small passages —95— converging upwardly from the base thereof toward the small chamber —94— with which they communicate, thereby establishing communication between said chamber —94— and the combustion chamber of the engine.

A check valve —96— is normally seated in the upper end of the central portion of the passage —92— to control communication between the passages —92— and —93—, said valve serving to prevent back flow of any excess from the combustion chamber of the engine into the passage —92— and permitting the delivery of the mixture from the passage —92— and through the passages —93— and —95— into the combustion chamber under a pressure higher than that produced by the piston of the engine during its compression stroke.

The high pressure air is introduced from any available source of supply through a suitable conduit —98— which is connected to an inlet port —99— in the enlarged portion —63— of the head —44— to communicate with a central opening —100— extending lengthwise through said head and normally closed at its lower end by an air valve —101— centrally within the oil-controlling valve —78—.

The air valve —101— surrounds the apex of the conical projection —84— of the pulverizer to prevent the entrance of oil into the central passage —85— and at the same time permits the high pressure air to enter the same passage, said valve being provided with a stem —102— of reduced diameter extending vertically through the head —44— and also through and above the collar —82— and is provided at its upper end with a head —103— having a central concave seat —104— in its upper face for the reception of the adjacent end of a suitable operating lever —105—. This lever —105— is fulcrumed coaxial with the lever —60— upon the same bracket —62— and has its outer end provided with a roller —106— riding upon the face of a cam disk —107— on the cam shaft —54— for opening the valve —101— against the action of a retracting spring —108— as shown more clearly in Fig. 5, said spring being interposed between the large portion —63— of the head —44— and head —103— on the valve rod —102— and is of sufficiently less tension than the spring —53— to permit the air valve —101— to be opened without opening the starting valve —42—.

The high pressure air inlet pipe —98— is preferably made in the form of a coil surrounding the upper end of the valve case so as to allow the desired vertical movement of the head —44— in opening the starting valve —42— in a manner previously described without liability of overstraining any of the connections of said inlet pipe —98— with the air compressor or source of supply for the high pressure air.

The valve mechanism shown in Fig. 7 is substantially the same as that shown in Fig. 5 except that the starting valve and its operating mechanism is omitted, it being necessary to use only one of the starting valves on one of the cylinders while the others may be equipped with the previously described apparatus for pulverizing the oil and controlling the introduction of the oil and high pressure air as a mixture into the combustion chamber of the engine.

The air inlet valve —16— and the exhaust valve —17— are opened at the proper time against the action of their retracting springs —29— and —30— by levers —110— and —111—, both of which are fulcrumed coaxial with the levers —60— and —105— upon the bracket —62— and are provided with roller bearings riding upon suitable cams —112— and —113— on the cam shaft —54—.

The amount of oil admitted to the combustion chamber or to the pulverizer is regulated automatically according to the load or speed of the engine by means of a slide valve —114— movable lengthwise of and within the stationary spindle —67— across the port —72—, said valve having a rod or stem —115— extending through the opposite end of the spindle and provided with a grooved collar —116— with which is engaged a pair of centrifugal governor levers —117—, whereby, as the speed of the engine increases, the valve —114— will be operated to gradually close the ports —72—, thereby reducing the quantity of oil admitted to the combustion chamber, while on the other hand, as the speed of the engine diminishes, the valve will be opened to allow the admission of a greater quantity of oil, thus establishing an automatic regulation of the speed of the engine.

Operation: In starting the engine, it is turned by hand or other external power sufficient to bring the piston corresponding to the cylinder upon which the starting valve is located to the beginning of its working stroke, by which operation the valve —42— will have been opened and the ports —52— registered with the ports —50—, whereupon the highly compressed air from an air bottle or other reservoir may be introduced into that cylinder through the passage —49— to start or initially spin the engine after which it works automatically in the manner previously described, the contact roller —59— being then moved aside out of contact with its cam —58— to prevent further operation of the valve —42— and to allow it to remain closed with the ports —52— out of registration with the ports —50—. During this automatic operation, the oil under its own gravity or low pressure opens the valve —78— only when the port —65'— of the cam shaft is registered with its companion port —72—, thus allowing the oil to lodge temporarily in the conical recess —83— of the pulverizer and at the proper time, the high pressure air valve —101— is opened to allow part of the air to pass directly through the central passage —85— and another part to force the oil from the recess —83— through the downwardly converging passages —86— where it mingles with the down flowing air in the main passage —43— and opens the check valve —96— to allow the mixture to pass through the ducts —93— and —95— into the combustion chamber of the engine at a time when a charge of fresh air admitted through the open valve —16— has been compressed by the compression stroke of the piston to a sufficiently high degree to develop the proper degree of heat for igniting such mixture, the introduction of the mixture into the combustion chamber being timed to correspond with the beginning of the working stroke of the piston after the charge of pure air has been compressed in the manner stated.

What I claim is:

1. In an internal combustion engine of the class described, a cylinder having an atmosphere-inlet port and an exhaust port, valves for said ports, engine-operated means for opening said valves, a valve case, an oil pulverizer within said case having a passage therethrough leading into the cylinder, a check valve in said passage, said valve case having an oil passage and an air passage both leading to the pulverizer, separate valves in the last named passages, the valve in the oil passage being opened by relatively low oil pressure, engine-operated means for controlling the flow of oil to the oil passage, and additional engine-operated means for opening the valve in the air passage, the check valve being opened by the high pressure air only when the valve in the air passage is opened.

2. In an internal combustion engine of the class described, an oil pulverizer comprising a tube having one end provided with a conical oil-receiving recess and oil ducts converging therefrom to the interior of the tube, said end being also provided with an air duct leading from a point above the recess to the interior of the tube at the point of convergence of the oil ducts, the opposite end of the tube having an outlet duct leading to the cylinder of the engine, and a check valve in said outlet duct opened by the pressure of the inflowing mixture and closing with and by the back pressure produced by the compression stroke of the piston.

3. In an internal combustion engine of the character described, a cylinder having a combustion chamber and a piston movable therein, an oil pulverizer comprising an upright tube having a relatively small passage therethrough connected by an additional relatively smaller passage with the combustion chamber, the upper end of the tube having a conical pocket of relatively larger diameter than and co-axial with the passage through the tube with which it communicates through a series of relatively small passages arranged about said axis, means for depositing oil in said pocket, an additional means for introducing air under high pressure into said pocket to bring the oil into a finely comminuted state through the several passages, and a check valve in the passage between that in the tube and the combustion chamber, said valve being arranged to open by the pressure of the inflowing mixture and to close with the back pressure from the combustion chamber of the engine.

4. In an internal combustion engine of the character described, the combination with a cylinder having a combustion chamber and a piston movable therein, of an oil pulverizer comprising an upright tubular member having the greater portion thereof between its ends provided with a central lengthwise passage connected at its lower end by a relatively smaller passage with the combustion chamber, a check valve in said smaller passage to prevent back pressure from the combustion chamber into the tubular member, the upper end of said tubular member being provided with a concentric conical recess communicating with the central passage and also provided with a central conical projection extending from the base to a point above the recess and provided with a central air passage therethrough communicating with the central passage in the tubular member, means for introducing oil under relatively low pressure into the conical recess, separate means for introducing air under a relatively high pressure into said recess and into the central passage in the conical projection, whereby the high pressure air causes the oil to be forced in a finely comminuted state from the conical recess through the several passages and into the combustion chamber.

5. In an internal combustion engine of the character described, the combination with a cylinder having a combustion chamber and a piston movable therein, of an oil pulverizer comprising an upright tubular member having a recess in its upper end communicating with the interior of said member through relatively smaller downwardly divergent passages and its lower end connected to the combustion chamber through a relatively small passage having a check valve therein to prevent back pressure from the combustion chamber to the interior of the tubular member, a mixing chamber opening into the conical recess and provided with separate concentric inlets co-axial with the conical recess for receiving air and oil, respectively, and separate valves for said inlets.

6. In an internal combustion engine of the character described, the combination with a cylinder having a combustion chamber and a piston movable therein, of an oil pulverizer comprising an upright tubular member communicating at its lower end through a relatively small passage with the interior of the combustion chamber and having a portion of said passage substantially co-axial with that through the tubular member, a check valve in the co-axial portion of said passage to prevent back pressure from the combustion chamber through the tubular member, the upper end of the tubular member being provided with a conical recess concentric with the axis thereof, a conical projection on the upper end of said tubular member extending upwardly from the base of the recess and provided with a passage therethrough communicating with the interior of said tubular member, means for introducing oil into said recess, and separate means for introducing air under high pressure into the recess and through said passages and tubular member into the combustion chamber for pulverizing the oil.

7. In an internal combustion engine of the character described, the combination with a cylinder having a combustion chamber and a piston movable therein, of an oil pulverizer comprising an upright tube having reversely arranged conical recesses in opposite ends thereof and co-axial with the axis of the tube and communicating with the interior thereof, the upper end of the tube being provided with a central conical projection rising from the base of the recess and provided with a central passage therethrough communicating with the interior of the tube, a mixing chamber surrounding said conical projection and communicating with the recess and provided with separate inlets for oil and air, respectively, the inlet for the air being co-axial with the tube and provided with a normally closed valve surrounding the upper end of the conical projection, the oil inlet surrounding the air inlet and provided with a valve surrounding the air valve and adapted to be opened by the inflow of oil, and means for opening the air valve after the oil valve has been opened and closed to allow the air to blow the oil from the recess through the several passages and tube into the combustion chamber.

In witness whereof I have hereunto set my hand this 16th day of May, 1914.

HUIBERT C. VERHEY.

Witnesses:
   H. E. CHASE,
   R. C. FULLER.